US006267600B1

(12) United States Patent
Song

(10) Patent No.: US 6,267,600 B1
(45) Date of Patent: Jul. 31, 2001

(54) MICROPHONE AND RECEIVER FOR AUTOMATIC ACCOMPANIMENT

(76) Inventor: Ryong Soo Song, #303, 503-10, Yonsu 1-dong, Yonsu-ku, Inchon-city (KR), 406-111

( * ) Notice: Subject to any disclaimer, the term of this patent is extended or adjusted under 35 U.S.C. 154(b) by 0 days.

(21) Appl. No.: 09/331,900

(22) PCT Filed: Dec. 2, 1998

(86) PCT No.: PCT/KR98/00397

§ 371 Date: Jul. 9, 1999

§ 102(e) Date: Jul. 9, 1999

(87) PCT Pub. No.: WO99/46957

PCT Pub. Date: Sep. 16, 1999

(30) Foreign Application Priority Data

Mar. 12, 1998 (KR) .................................................. 98-8310

(51) Int. Cl.$^{7}$ ............................. G09B 15/04; G10H 1/36

(52) U.S. Cl. ................................. 434/307 A; 434/307 R; 84/610

(58) Field of Search ................................ 434/307 R–309, 434/318, 365; 84/600, 609, 610, 634, 645, 604; 341/176, 173; 381/172; 181/179; 369/49; 359/159, 172, 180

(56) References Cited

U.S. PATENT DOCUMENTS 5,323,257 * 6/1994 Abe et al. ............................ 359/159
5,598,162 * 1/1997 Terashima et al. .................. 341/146
5,606,143 * 2/1997 Young .................................... 84/600
5,726,373 * 3/1998 Choi et al. ............................ 84/609

FOREIGN PATENT DOCUMENTS

0806758 A1 * 11/1997 (EP) .
8-280082 * 10/1996 (JP) .
10-108288 * 4/1998 (JP) .
10-240276 * 9/1998 (JP) .
94/27282 * 11/1994 (WO) .

* cited by examiner

*Primary Examiner*—Joe H. Cheng
(74) *Attorney, Agent, or Firm*—Staas & Halsey LLP

(57) ABSTRACT

A microphone and receiver for automatic accompaniment in which the microphone outputs a mixed audio signal of a selected melody and a song voice signal resulting from singing a song to the accompaniment of the selected melody, and image control data corresponding to the selected melody. The microphone stores, plays and outputs the mixed audio signal and/or song voice signal and the receiver receives the mixed audio signal and/or the song voice signal outputted from the microphone, and outputs the mixed audio signal and/or song voice signal to a television receiver set, and at the same time, generates a caption image correspond to song words of the selected melody and a background image according to the received image control data, for output to the television receiver set.

19 Claims, 4 Drawing Sheets

MICROPHONE AND RECEIVER FOR AUTOMATIC ACCOMPANIMENT

CROSS-REFERENCE TO RELATED APPLICATIONS

This application claims the benefit of Korean Application No. 98-8310, filed Mar. 12, 1998, in the Korean Patent Office and International Application No. PCT/KR 98/00397 filed Dec. 2, 1998, the disclosures of which are incorporated herein by reference.

BACKGROUND OF THE INVENTION

1. Field of the Invention

The present invention relates to a microphone for automatic accompaniment and a receiver therefor, and more particularly, to a microphone for automatic accompaniment and a receiver therefor in which the microphone serves to output a mixed audio signal of a selected melody and a song voice signal resulting from singing a song to the accompaniment of the selected melody and image control data corresponding to the accompaniment melody, and store and play the mixed audio signal and/or song voice signal to output it, and in which the receiver receives the mixed audio signal and/or the song audio signal outputted from the microphone to output to a television receiver set, and at the same time generates a caption image corresponding to the song words and background image according to the received image control data to output to the television receiver set.

2. Description of the Related Art

Generally, a wireless microphone serves to convert a sound wave signal into an electronic signal having frequencies in the zone of an FM signal to be sent to a FM receiver provided in audio systems such as a radio, cassette tape recorder and the like, and the signal outputted from the wireless microphone is also output through a speaker provided within or outside the system.

If audio systems are provided with playback means by which accompaniment melody-data recorded in an audio tape are played-back, an audio signal output from the wireless microphone is synthesized to an accompaniment melody, so that a user can sing a song to the accompaniment of the melody.

However, there is a problem in the conventional system in that the audio tape and the like are rapidly wound and re-wound to select an accompaniment melody for a song and thereafter a playback key must be pushed to play-back the accompaniment melody, thereby causing much inconvenience and requiring a lot of time spent in operating the audio systems.

Also, in the conventional systems, there is another problem in that since the number of the accompaniment melodies recorded in an audio tape is limited to about 15 to 20 pieces, a user has to purchase a number of audio record tapes to have a lot of accompaniment melodies.

Meanwhile, lyrics accompaniment devices (what is called "a karaoke device") are well known as devices for practicing singing a song. The lyrics accompaniment devices are provided therein with a monitor, a hardware system and a microphone, integrated with each other, wherein an accompaniment melody selected by a user is output through a speaker and at the same time a corresponding subtitle, song words and background image appear on the screen of the monitor.

The lyrics accompaniment devices enable changing continuously the color of the subtitle or song words on the screen while the selected melody is output through the speaker.

Such lyrics accompaniment devices are provided with a memory unit in the hardware system and serve to store a number of accompaniment melodies therein, so that a user can select a desired accompaniment melody among the stored accompaniment melody to sing a song to the accompaniment of the melody.

However, the lyrics accompaniment devices are complex in structure and are large in its volume, thereby causing inconvenience in carring them.

In constrast, a lyrics accompaniment device disclosed in the Korean Patent No. 93362 registered in Korea is provided within a microphone and provided with a memory unit for storing a number of accompaniment melodies to be selected by a user. In the lyrics accompaniment device provided in the microphone, a song voice signal and an accompaniment melody are mixed to thereafter be converted into a FM signal and outputted, so that a user with the microphone can sing a song to the accompaniment of the selected melody everywhere a FM receiver and (or) television receiver set are (is) present regardless of time and place.

However, there is a problem in the lyrics accompaniment device disclosed in the Korean Patent No. 93362 in that the device is not provided with storing means and playing means by which a user's songs are stored and output, respectively, so the user cannot confirm whether or not he exactly sings a song to the accompaniment of the melody.

In addition, the lyrics accompaniment device disclosed in Korean Patent Application No. 96-7198 filed in Korea prior to the filing of the present application is provided within a microphone which is provided with memory units in which an accompaniment melody, background images and song caption images are stored. The accompaniment melody selected by a user, the background image and caption image corresponding to the melody are converted into an FM signal to be output, and a song voice signal is also converted into an FM signal to be output, so that the user can sing a song to the accompaniment of the melody everywhere a FM recever and/or television receiver set is (are) present regardless of the time and place.

However, there is a problem in the lyrics accompaniment device disclosed in the Korean Patent Application No. 96-7198 in that the device is not provided with storing means and playing means by which a user's songs are stored and output, respectively, so the user cannot confirm whether or not he exactly sings a song to the accompaniment of the melody.

In addition, there is a problem in the lyrics accompaniment device in that because the background image and song caption image corresponding to the accompaniment melody are transmitted from the microphone to appear on the screen of the television set, the image which appears on the screen of the television receiver set waves in response to motion of the user holding the microphone.

SUMMARY OF THE INVENTION

It is an object of the invention to provide a microphone for automatic accompaniment which stores and outputs a song voice signal resulting from a user's song according to the accompaniment melody or a mixed sound signal resulting from the user's song to the accompaniment of a selected melody.

It is another object of the invention to provide a microphone for automatic accompaniment and a receiver for receiving a signal from the microphone in which the microphone serves to transmit a mixed voice signal, a background image corresponding to an accompaniment melody and image control data of the song caption image, and in which the receiver serves to receive the song voice signal resulting from the user's song and/or the mixed voice signal outputted from the microphone for automatic accompaniment, wherein the receiver transmits the same to the television receiver set and at the same time generates a caption image of song words and a background image according to the received image control data.

In order to achieve the above and other objects of the present invention, the microphone for automatic accompaniment according to the present invention comprises record/playback means and accompaniment melody/song voice signal output means for outputting a song voice (audio) signal or a mixed voice(audio) signal mixed with the song voice signal, and the mixed voice signal outputted form the accompaniment melody/song voice signal output means is stored by the record/playback means and converted into an FM signal by transmitting means to be transmitted to a receiver.

A song to the accompaniment of a melody is completed, and when a user selects a playback operation, the mixed voice signal stored in the record/playback means or the song voice signal is reproduced through the record/playback means and transmitted with an FM signal through the transmitting means.

The record/playback means comprises a memory unit, an analogue-to-digital converter and a digital-to-analogue converter. The analogue/digital converter converts the output signal signal outputted from the accompaniment melody/song voice (audio) signal into a digital signal to be stored in the memory unit. In the case of reproducing the stored signal, the stored signal is outputted from the memory unit and converted into an analogue signal through the digital to analogue converter.

In order to achieve the above and other objects of the present invention, according to the microphone for automatic accompaniment and receiver therefor, the microphone serves to transmit the song voice (audio) signal or the mixed voice signal together with the image control data of the background image and song caption image according to the accompaniment melody.

The receiver receives the song voice signal or the mixed voice signal transmitted from the microphone and outputs the same to the television receiver set, and at the same time serves to generate a song caption image and a background image for the accompaniment melody according to the received image control data, and thereafter outputs generated images to the television receiver set so that the images appear on the screen of the television receiver set.

BRIEF DESCRIPTION OF THE DRAWINGS

The present invention may be better understood, and its numerous objects, features, and advantages made apparent to those skilled in the art by reference to the accompanying drawings, in which the use of the same reference symbols in different drawings indicates similar or identical items.

DESCRIPTION OF THE PREFERRED EMBODIMENTS

Hereinafter, preferred embodiments of the present invention will now be described with reference to the attached drawings.

Figure 1:
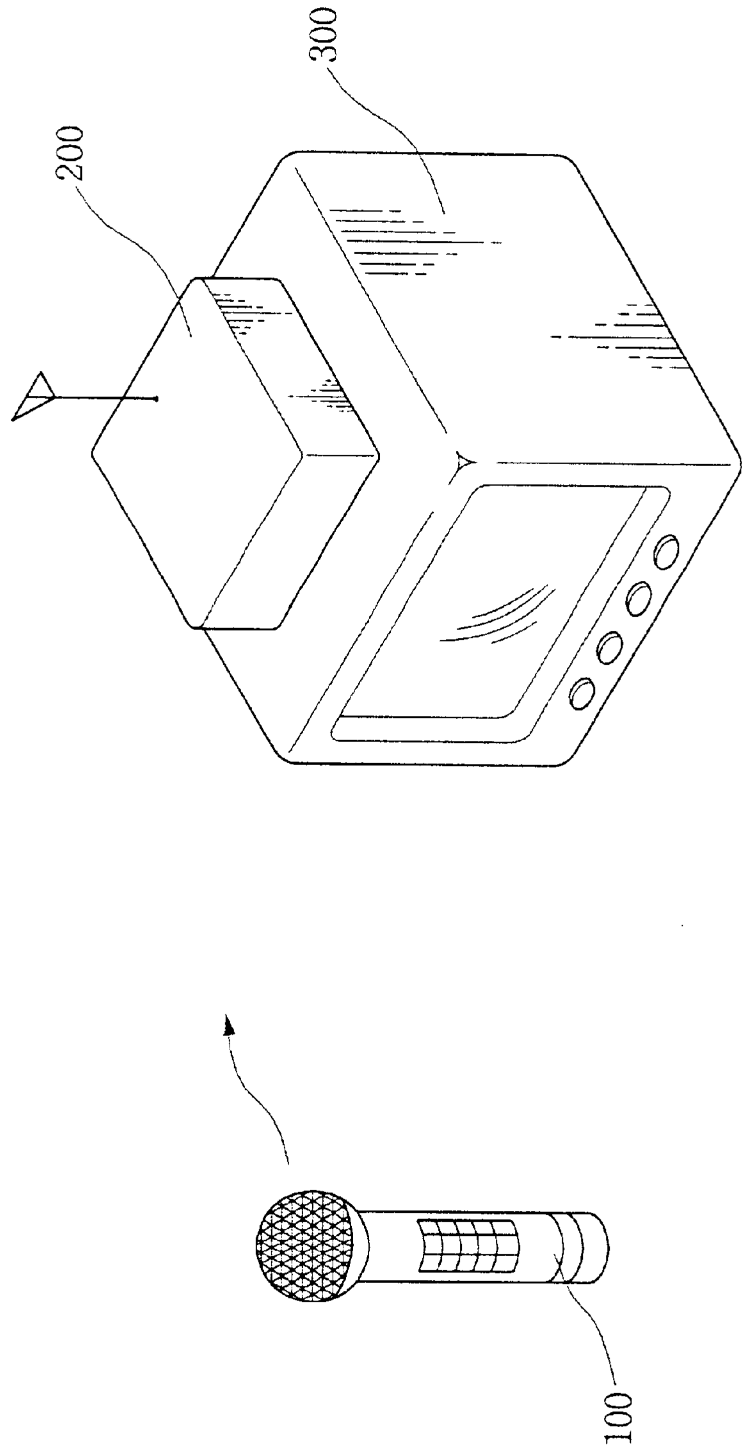
FIG. 1 is a perspective view showing a microphone and a receiver therefor according to the present invention.

FIG. 1 is a perspective view showing the microphone for automatic accompaniment and a receiver therefor according to the present invention.

Referring to FIG. 1, reference numeral 100 indicates the microphone for automatic accompaniment. The microphone 100 serves to store the accompaniment melody selected by a user and mixed voice signal formed by mixing a song voice signal with the accompaniment melody, to convert the mixed voice signal into a FM signal to transmit the FM signal, and to generate and convert image control data according to the selected accompaniment melody into an FM signal to transmit the same.

Reference numeral 200 indicates a receiver according to the present invention.

The receiver 200 serves to receive the mixed voice signal transmitted from the microphone 100 for automatic accompaniment and output the same to the television receiver set 300, to generate a caption image of song words and a background image according to image control data transmitted from the microphone 100, and to output the background image and caption image to the television receiver set 300 so that the images appear on the screen the television receiver set 300.

Figure 2:
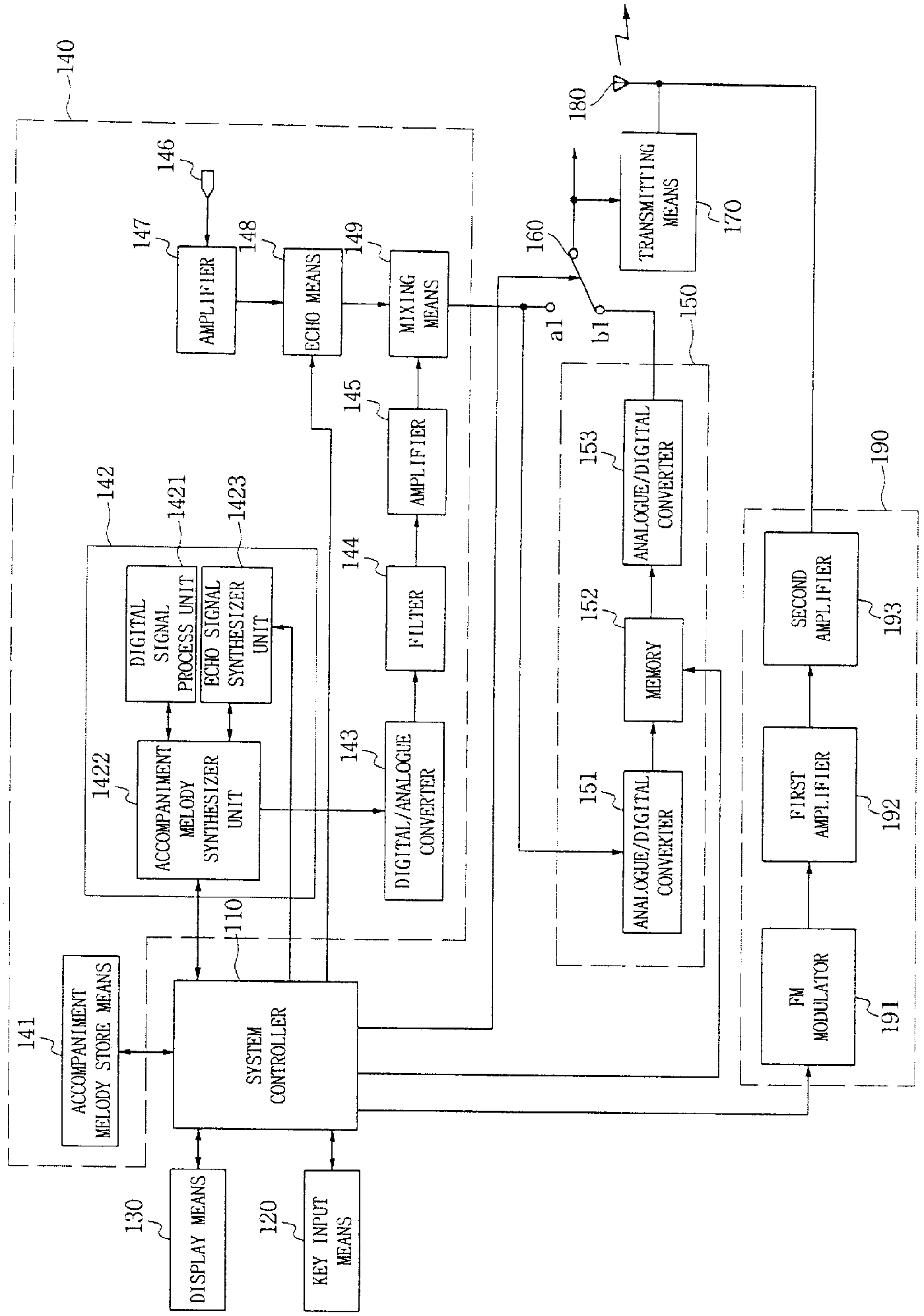
FIG. 2 is a block diagram illustrating a microphone for automatic accompaniment according to an embodiment of the present invention.

FIG. 2 is a block diagram showing the microphone 100 for automatic accompaniment according to an embodiment of the present invention.

The microphone 100 for automatic accompaniment as shown in FIG. 2 comprises a system controller 110 for controlling transmission of a song and an accompaniment melody selected by a user's manipulation, for controlling storage and playback, and for controlling transmission of image control data stored in the microphone 100 and corresponding to a caption image for song words and a background image according to the selected accompaniment melody; key input means 120 for inputting an operation instruction into the system controller 110; display means 130 for displaying an operation state in response to control of the system controller 110; mixed voice signal output means 140 for outputting an accompaniment melody selected by a user according to control of the system controller 110 and at the same time mixing the song voice signal and the accompaniment melody, to generate a mixed voice signal; record and playback means 150 for storing and outputting the mixed voice signal of the mixed voice signal output means 140 in response to control of the system controller 110; a switch 160 for outputting selectively the output signal of the output means 140 and record/playback means 150 in response to control of the system controller 110; transmitting means 170 for converting the mixed voice signal or the stored mixed voice signal selected by the switch 160 into an FM signal to transmit the same through an antenna 180; and image control data transmitting means 190 for converting the image control data outputted from the system controler 110 into an FM signal to transmit the same through the antenna 180.

The mixed voice signal output means 140 comprises accompaniment melody store means 141 for storing in separate regions of memory space accompaniment melody data for lyrics, nursery songs, hymns and the like, and to thereafter output the selected accompaniment melody in response to control of the system controller 110, accompaniment melody synthesizing means 142 for controlling the accompaniment melody output from the accompaniment melody store means 141 in response to control of the system controller 110, and to synthesize and output a corresponding echo melody signal, a digital-to-analogue converter 143 for converting the echo melody signal output from the accompaniment melody synthesizing means 142 to an analogue signal, a filter 144 for filtering the analogue signal output from the converter 143, an amplifier 145 for amplifying the filtered signal output from the filter 144, an amplifier 147 for amplifying a song sound signal inputted through a microphone part (such as a mouth piece) 146, echo means 148 for echoing the amplified song sound signal output from the amplifier 147 in response to control of the system controller 110, mixing means 149 for mixing the amplified filtered signal from the amplifier 145 and the echo song sound signal echo means 148.

The accompaniment melody synthesizing means 142 includes a digital signal processing unit 1421 for converting the accompaniment melody signal read by the accompaniment melody store means 141 into a digital signal, an accompaniment melody synthesizer unit 1422 for synthesizing the digital signal output from the digital signal processing unit 1421 into a digital accompaniment melody signal, and echo signal synthesizer unit 1423 for echoing the digital accompaniment melody signal synthesized in the accompaniment melody synthesizer unit 1422 in response to a user's selection.

The record and playback means 150 comprises an analogue-to-digital converter 151 for converting the output signal (mixed voice signal) of the mixed voice signal output means 140 into a digital mixed signal, a memory unit 152 for storing and outputting the digital mixed signal of the analogue/digital converter 151 in response to control of the system controller 10, and a digital to analogue converter 153 for converting the output digital mixed signal from of the memory unit 152 into an analogue mixed signal to thereafter output the same to the switch 160.

Figure 3:
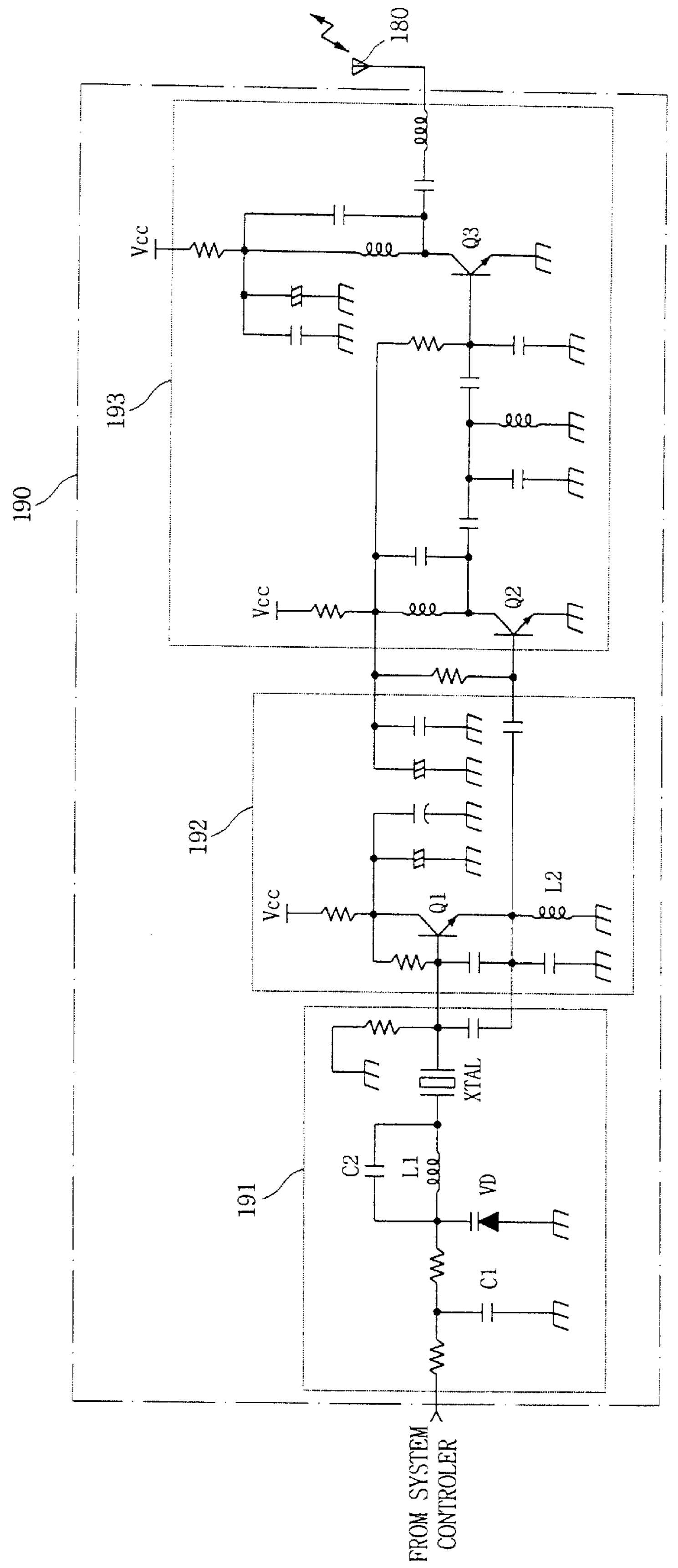
FIG. 3 is a circuit diagram illustrating image control data transmitting means as shown in FIG. 2.

The image control data transmitting means 190, as shown in the FIG. 3, comprises an FM modulator 191, a first amplifier 192 and a second amplifier 193. The FM modulator 191 generates an FM modulating signal while a crystal XTAL oscillates according to a time constant of oscillation predetermined by a variable capacitance diode VD, a condenser C2 and a coil L1, where the variable capacitance diode VD varies in its capacitance according to the the image control data outputted from the system controller 110. The first amplifier 192 serves to amplify the amplified signal output from the FM modulator 191 with a transistor Q1. The second amplifier 193 serves to amplify the output signal of the first amplifier 192 with transistors Q2 and Q3 and thereafter transmit the same through the antenna 180.

With the microphone for automatic accompaniment thus constructed, if a user selects a desired song by manipulating the key input means 120 provided within the microphone prior to singing a song, the system controller 110 is activated to determine the desired accompaniment melody to display it through the display means 130, and also to output the desired accompaniment melody through from the accompaniment melody store means 141 and at the same time output the image control data according to the accompaniment melody to the image control data transmitting means 190.

The accompaniment melody outputted from the accompaniment melody store means 141 is input into the accompaniment melody synthesizer unit 142 through the system controller 110 so that the accompaniment melody is synthesized and outputted.

That is to say, the accompaniment melody outputted from the accompaniment melody store means 141 is processed in the digital signal processing unit 1421 of the accompaniment melody synthesizer unit 142 as a piano sound signal or signals of any other musical instruments, and synthesized by the accompaniment melody synthesizing unit 1422.

At this time, when the user selects an echo function by manipulating the key input means 120, the accompaniment melody synthesized by the accompaniment melody synthesizer unit 1422 is echo-processed by the echo signal synthesizer unit 1423 to be output from the accompaniment melody synthesizer unit 1422.

The accompaniment melody outputted from the accompaniment melody synthesizer unit 142 is converted into an analogue signal by the digital-to-analogue converter 143, filtered through the filter 144, and amplified by the amplifier 145 to thereafter be outputted to a fixing terminal (al) of the switch 160 through the mixing means 149.

Where, in case the user allows the melody stored in the accompaniment melody store means 141 to be outputted to sing a song, the moving terminal of the switch 160 is electrically connected to the fixing terminal (a1) by the system controller 110.

Then, the accompaniment melody outputted from the mixing means 149 is outputted through the switch 160 and converted into an FM signal by the transmitting means 170 to be wirelessly transmitted via the antenna 180.

In this state, when a user sings a song to the accompaniment of the melody outputted to an audio system, the song sound signal is input to the microphone part 146 to be amplified by the amplifier 147, and is echo-processed by the echo means 148 in response to the system controller 110 to thereafter be input to the mixing means 149.

The mixing means 149 serves to mix the accompaniment melody (amplified filtered signal) outputted from the amplifier 145 with the song sound (echo song sound) signal outputted from the echo means 148. The sound signal mixed by the mixing means 149 is outputted via the switch 160, and converted into an FM signal by the transmitting means 170 to thereafter be transmitted wirelessly via the antenna 180.

During such operations, the mixed sound (voice) signal 20 outputted from the mixing means 149 is converted into a digital signal by the analogue-to-digital converter 151 of the record and playback means 150 and inputted into the memory unit 152. The memory unit 152 successively stores the digital signals outputted from the analogue-to-digital converter 151 in response to address signals outputted from the system controller 110.

And, the image control data according to the accompaniment melody and outputted from the system controller 10 is inputted into the FM modulator 191 and the capacitance of the variable capacitance diode VD varies in response to the image control data, and accordingly the oscillation time constant determined by the variable capacitance diode VD, condenser C2 and coil L1 varies.

As a result, the FM modulated signal is generated while the oscillation frequency of the crystal XTAL varies in response to the image control data, the FM modulation signal of the image control data generated by the FM modulator 191 is amplified through the transistor Q1 and is again amplified through the transistors Q2, Q3 in the second amplifier 193 to thereafter to be transmitted through the antenna 180.

When the user finishes singing a song and selects a playback function by manipulating the key input means 120, the system controller 110 controls the switch 160 so that the moving terminal is electrically connected to the other fixing terminal (b1), and at the same time controls the memory unit 152 of the record and playback means 150 so that the stored signal is outputted in order.

The signal outputted from the memory unit 152 is converted into the analogue signal by the digital-to-analogue converter 153 to thereafter be outputted through the switch 160 and is converted into the FM signal by the transmitting means 170 to thereafter be transmitted through the antenna 180.

Figure 4:
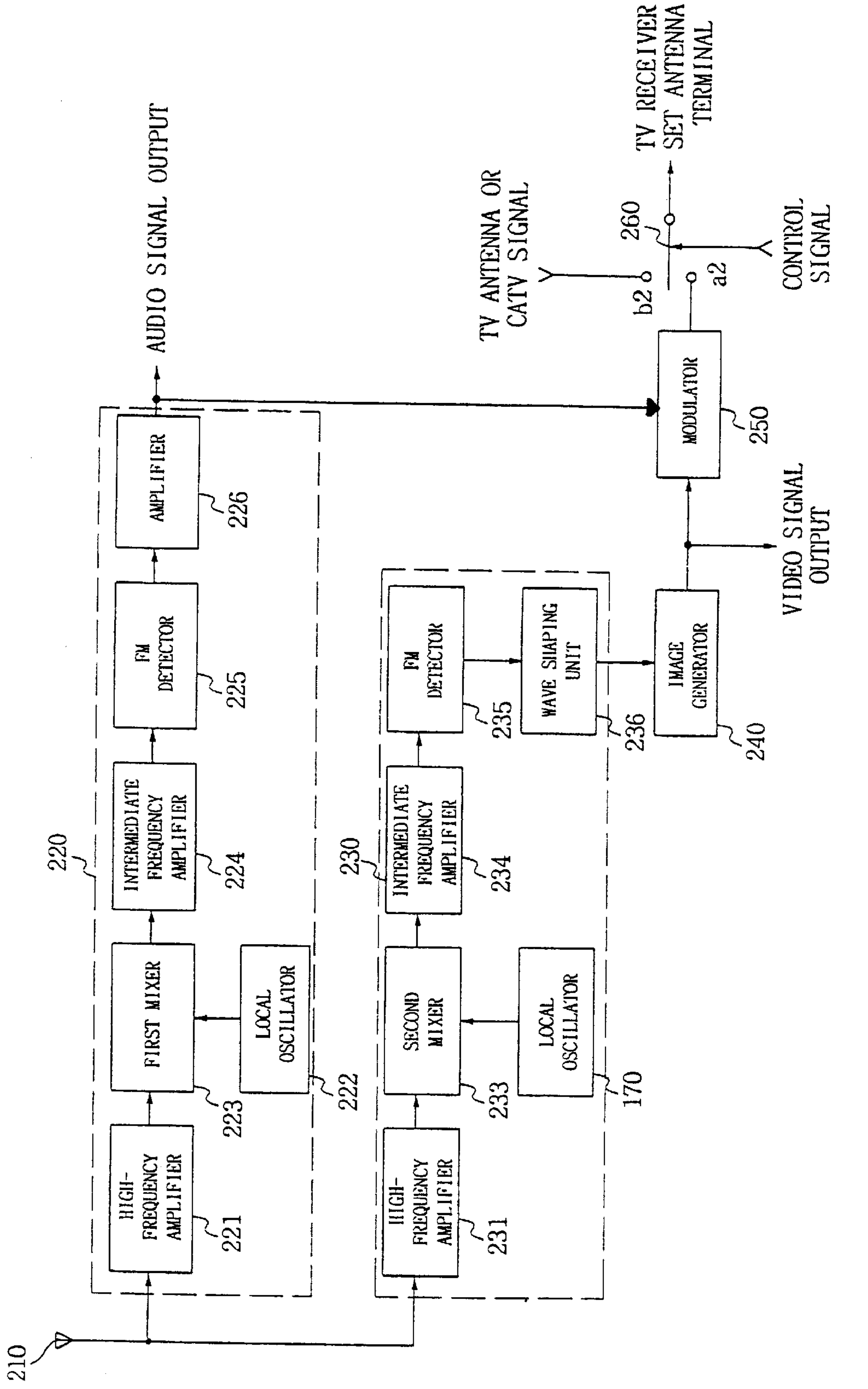
FIG. 4 is a block diagram showing a receiver according to the embodiment of the present invention.

FIG. 4 is a block diagram showing a receiver according to the embodiment of the present invention.

The receiver 200 comprises a first receiving unit 220 for receiving a mixed voice signal in high frequency received by the antenna 210, a second receiving unit 230 for receiving image control data in high frequency received by the antenna 210, an image generator 240 for generating a background image and a caption image of song words according to the image control data received by the second receiving unit 230, a modulator 250 for modulating the mixed sound (voice) signal received by the first receiving unit 220, the background image and caption image of song words generated by the image generator 240 into a television broadcasting signal to be output, and a switch 260 for selecting a television antenna/CATV signal or a modulation signal of the modulator 250 in response to a control signal for output to an antenna terminal of the television receiver set 300.

The first receiving unit 220 comprises a high-frequency amplifier 221 for amplifying a received signal of the antenna 210, a local oscillator 222 for generating a local oscillating signal, a first mixer 223 for outputting an intermediate-frequency signal by mixing the amplified signal of the high frequency amplifier 221 and local oscillating signal from the local oscilator 222, an intermediate freqency amplifier 224 for amplifying the intermediate frequency signal outputted by the first mixer 223, an FM detector 225 for detecting a mixed voice signal from the amplified intermediate frequency signal of the intermediate frequency amplifier 224, and an amplifier 226 for amplifying the mixed voice signal detected by the FM detector 225.

The second receiving unit 230 comprises a high-frequency amplifier 231 for amplifying the received signal of the antenna 210, a local oscillator 232 for generating a local oscillating signal, a second mixer 233 for outputting an intermediate-frequency signal by mixing the amplified signal of the high frequency amplifier 231 and the local oscillating signal from the local oscilator 232, an intermediate freqency amplifier 234 for amplifying the intermediate frequency signal outputted by the second 223, an FM detector 235 for detecting an image control data signal from the amplified intermediate frequency signal of the intermediate frequency amplifier 234, and a wave shaping unit 236 for wave-shapping the image control data detected by the FM detector 235, and transmitting the same to the image generator 240.

According to the receiver 200 of the present invention thus constructed, the high frequency signal transmitted by the microphone 100 is inputted into the first receiving unit 220 and second receiving unit 230 through the antenna 210.

The first receiving unit 220 serves to generate an intermediate frequency signal by amplifying the received high-frequency signal through the high frequency amplifier 221 and mixing it with the local oscillating signal of the local oscillator 222 through the first mixer 223.

The intermediate frequency signal generated by the first mixer 223 is amplified through the intermediate frequency amplifier 224, the mixed voice signal is detected by the FM detector 225, and the detected mixed voice signal is amplified by the amplifier 226 to be output.

The second receiving unit 230 generates an intermediate frequency signal by amplifying the received high-frequency signal through the high-frequency amplifier 231 and mixing it with the local oscillating signal of the local oscillator 232 through the second mixer 233.

The intermediate frequency signal generated by the second mixer 233 is amplified by the intermediate frequency amplifier 234, the image control data is detected by the FM detector 235, and the the detected image control data is wave-shaped through by the wave shaping unit 236 to thereafter be outputted.

The image control data outputted from the second receiving unit 230 is inputted into the image generator 240. Then, image generator 240 generates the caption image of song words and the background image corresponding to the image control data to output.

As a result of such construction, the mixed voice signal outputted from the first receiving unit 220 and the background image and caption image of song words outputted from the image generator 240 are inputted into the the audio/video terminal of the television receiver set 300, the television receiver set 300 serves to amplify the inputted mixed audio (voice) signal to output it through a speaker thereof and to display the background image and caption image of song words on a screen thereof. Thus, a user can sing a song to the accompaniment of a melody outputted from the speaker, while watching the background image and caption image of song words which appear on the screen.

And, the mixed audio (voice) signal outputted from the first receiving unit 220 and the background image and caption image of song words outputted from the image generator 240 are inputted into the modulator 250, the modulator 250 modulates the inputted mixed audio (voice) signal and the background image and caption image of song words into the television broadcasting signal, and outputs them to a fixing terminal a2 of the switch 260.

The switch 260 enables the moving terminal to be connected to the fixing terminal a2 in response to input of the control signal when the receiver 200 is turned-on, the mixed audio (voice) signal images of the background and caption modulated by the modulator 250 are inputted into the television receiver set, the mixed audio signal is outputted through the speaker, thereof and the background image and the caption image appear on the screen the television receiver set 300. Thus, the user can sing a song to the accompaniment of the selected melody outputted from the speaker, watching the background image and caption image on the screen.

In addition, when the receiver 200 is turned-off, the control signal is not inputted, so that the moving terminal of the switch 260 is connected to the other fixing terminal b2, and the user can again watch television as usual.

In the foregoing, storing and playing the mixed audio signal resulting from mixing of the accompaniment melody and song voice signal into the record and playback means 150 was explained as an embodiment.

However, the present invention is not restricted to a limit of the record and playback means 150, but can vary according to different types. For example, the present invention may be constructed in such a manner that the echo means 148 can be connected directly to the record and playback means 150 so that only the song sound signal can be stored in the record and playback means 150 and outputted.

As another example, the present invention may be constructed in such a manner that the output signals of the echo means 148 and the amplifier 145 are outputted to two units of the record and playback means 150 in which the song sound signal and accompaniment melody are separately and respectively stored, and when the stored song sound signal and accompaniment melody are played-back, the audio signal and/or accompaniment melody could be selected from the separate two record and playback means 150 to be output.

As the other embodiment, even if the microphone 100 does not have the image control data transmitting means 190, the mixed audio signal of the song voice signal and the accompaniment melody or the song voice signal could be FM-modulated to be transmitted, and alternatively could be recorded and played by the record/playback means 150 to thereafter be FM-modulated to be transmitted, so that an audio system provided with an FM receiver receives and outputs the signals transmitted from the microphone 100.

According to the present invention, the record and playback instrument in the microphone enables a user to store the song sound signal and to output the same with the stored accompaniment melody, thereby allowing the user to confirm whether he is correctly singing a song to the accompaniment of the melody and to improve his capability in singing a song.

According to the present invention, the microphone for automatic accompaniment serves to transmit the accompaniment melody, song voice signal and image control data, and the receiver serves to receive the accompaniment melody and the song voice signal to generate the background image and caption image in response to the image control data, and outputs the accompaniment melody, and the song voice signal, the background image and the caption image to the television receiver set, so that a stable images appear on the screen of the television receiver set even though the microphone is greatly oscillated. Thus, stable images appear on the screen of the television irrespective of the movement of the microphone.

While the present invention has been particularly shown and described with reference to the particular embodiments thereof, it will be understood by those skilled in the art that various changes in form and details may be effected therein without departing from the spirit and scope of the invention as defined by the appended claims.

What is claimed is:

1. An automatic accompaniment device which receives sound waves related to an accompaniment melody, and communicates with a television set, comprising:

a microphone to generate a song audio signal from the sound waves, store a plurality of accompaniment melodies, FM-modulate the song audio signal, the accompaniment melody which is selected from the plurality of stored accompaniment melodies and image control data corresponding to the accompaniment melody, and to generate and output a modulated signal; and a receiver to receive the modulated signal transmitted from the microphone, extract and output the accompaniment melody and song audio signal from the modulated signal to the television receiver set, extract the image control data from the modulated signal, generate a caption image of song word and a background image corresponding to the accompaniment melody in response to the image control data, and transmit the caption and background images to the television receiver set;

wherein the microphone comprises mixed audio signal output means for outputting the accompaniment melody and mixing the song audio signal with the accompaniment melody to generate a mixed audio signal and record and playback means for storing and playing back the mixed audio signal.

2. The automatic accompaniment device as claimed in claim 1, wherein the microphone comprises:

a system controller to control transmission of the audio signal, the accompaniment melody and the image control data corresponding to the accompaniment melody; key input means for inputting an operation instruction to the system controller;

display means for displaying an operation state in response to control of the system controller;

a switch to selectively output the mixed audio signal of the mixed audio signal output means and the stored mixed audio signal of the record and playback means in response to control from the system controller;

transmitting means, including an antenna, for converting the signal selectively output by the switch into a high frequency signal to be transmitted by the antenna; and image control data transmitting means for FM-modulating the image control data outputted from the system controller to be transmitted by the antenna.

3. The automatic accompaniment device as claimed in claim 2, wherein:

the record and playback means stores and outputs the mixed audio signal in response to the control of the system controller; and the switch selectively outputs the mixed audio signal outputted from the mixed audio signal output means, and the stored mixed audio signal outputted from the record/playback means, to the transmitting means.

4. The automatic accompaniment device as claimed in claim 3, wherein the record and playback means stores and outputs the mixed audio signal and the accompaniment melody output from the mixed audio signal output means.

5. The automatic accompaniment device as claimed in claim 3, wherein:

the mixed audio signal output means outputs the song audio signal; and the record and playback means stores and outputs the song audio signal output from the mixed audio signal output means.

6. The automatic accompaniment device as claimed in claim 3, wherein:

the mixed audio signal output means outputs the song audio signal; and the record and playback means stores the song audio signal, the accompaniment melody outputted from at least one of the mixed audio signal output means and the mixed audio signal, for selective output thereof.

7. An automatic accompaniment device which receives sound waves related to an accompaniment melody, and communicates with a television set, comprising:

a microphone to generate a song audio signal from the sound waves, store a plurality of accompaniment melodies, FM-modulate the song audio signal, the accompaniment melody which is selected from the plurality of stored accompaniment melodies and image control data corresponding to the accompaniment melody, to generate and output a modulated signal; and a receiver to receive the modulated signal transmitted from the microphone, extract and output the accompaniment melody and song audio signal from the modulated signal to the television receiver set, extract the image control data from the modulated signal, generate a caption image of song word and a background image corresponding to the accompaniment melody in response to the image control data, and transmit the caption and background images to the television receiver set;

wherein the microphone comprises accompaniment melody store means for storing the plurality of accompaniment melodies and outputting the accompaniment melody in response to control of a system controller;

accompaniment melody synthesizing means for processing the accompaniment melody output from the accompaniment melody store means in response to control of the system controller, to synthesize the accompaniment melody and output a corresponding echo signal;

a digital-to-analogue converter to convert the echo signal of the accompaniment melody synthesizing means into an analogue signal;

a filter to filter the analogue signal output from the digital-to-analogue converter;

a first amplifier to amplify the filtered analogue signal output from the filter;

a second amplifier to amplify an audio signal corresponding to the sound waves inputted through the microphone;

echo means for echoing the amplified audio signal output from the second amplifier in response to control of the system controller; and mixing means for mixing the amplified filtered analogue signal output from the first amplifier and the amplified audio signal output from the echo means.

8. The accompaniment device as claimed in claim 7, wherein the accompaniment melody synthesizing means comprises:

a digital signal process unit to convert the accompaniment melody output from the accompaniment melody store means into a digital signal;

an accompaniment melody synthesizer unit to synthesize the digital signal output from the digital signal process unit into an accompaniment melody signal; and echo signal synthesizer unit for echoing the accompaniment melody signal synthesized in the accompaniment melody synthesizer unit in response to a selection of a user, so that the accompaniment melody synthesizer unit generates the echo signal.

9. An automatic accompaniment device which receives sound waves related to an accompaniment melody, and communicates with a television set, comprising:

a microphone to generate a song audio signal from the sound waves, store a plurality of accompaniment melodies, FM-modulate the song audio signal, the accompaniment melody which is selected from the plurality of stored accompaniment melodies and image control data corresponding to the accompaniment melody, to generate and output a modulated signal, the microphone comprising a system controller to control transmission of the audio signal, the accompaniment melody and the image control data corresponding to the accompaniment melody;

key input means for inputting an operation instruction to the system controller;

display means for displaying an operation state in response to control of the system controller;

mixed audio signal output means for outputting the accompaniment melody and mixing the song audio signal with the accompaniment melody to generate a mixed audio signal;

record and playback means for storing and playing back the mixed audio signal;

a switch to selectively output the mixed audio signal of the mixed audio signal output means and the stored mixed audio signal of the record and playback means in response to control from the system controller;

transmitting means, including an antenna, for converting the signal selectively output by the switch into a high frequency signal to be transmitted by the antenna; and image control data transmitting means for FM-modulating the image control data outputted from the system controller to be transmitted by the antenna; and a receiver to receive the modulated signal transmitted from the microphone, extract and output the accompaniment melody and song audio signal from the modulated signal to the television receiver set, extract the image control data from the modulated signal, generate a caption image of song word and a background image corresponding to the accompaniment melody in response to the image control data, and transmit the caption and background images to the television receiver set;

wherein the record and playback means comprises an analogue-to-digital converter to convert the mixed audio signal of the mixed audio signal output means into a digital signal;

a memory unit to store and output the digital signal of the analogue-to-digital converter in response to control of the system controller; and a digital-to-analogue converter to convert the digital signal output from the memory unit into the stored mixed audio signal as an analogue signal, and the record and playback means stores and outputs the mixed audio signal in response to the control of the system controller; and the switch selectively outputs the mixed audio signal outputted from the mixed audio signal output means, and the stored mixed audio signal outputted from the record/playback means, to the transmitting means.

10. An automatic accompaniment device which receives sound waves related to an accompaniment melody, and communicates with a television set, comprising:

a microphone to generate a song audio signal from the sound waves, store a plurality of accompaniment melodies, FM-modulate the song audio signal, the accompaniment melody which is selected from the plurality of stored accompaniment melodies and image control data corresponding to the accompaniment melody, to generate and output a modulated signal; and a receiver to receive the modulated signal transmitted from the microphone, extract and output the accompaniment melody and song audio signal from the modulated signal to the television receiver set, extract the image control data from the modulated signal, generate a caption image of song word and a background image corresponding to the accompaniment melody in response to the image control data, and transmit the caption and background images to the television receiver set, wherein the receiver comprises a first receiving unit to receive the modulated signal transmitted by the microphone and extract a mixed audio signal generated by mixing the song audio signal with the accompaniment melody, and the song audio signal from the modulated signal;

a second receiving unit to receive the modulated signal transmitted by the microphone and extract the image control data from the modulated signal;

an image generator to generate the background image and caption image of song words according to the image control data received by the second receiving unit; and a modulator to modulate the background image and caption image of song words generated by the image generator into a television broadcasting signal to be output to the television receiver set.

11. The automatic accompaniment device as claimed in claim 10, wherein the receiver includes a switch to enable transmission of the background image and caption image of song words from the modulator to the television receiver set while electric power to the receiver is turned-on, and to at least one of an input television antenna signal and a cable television (CATV) signal into the television receiver set while the electric power is turned-off.

12. A microphone for automatic accompaniment, comprising:

a system controller to control storage and outputting of a selected accompaniment melody and a song audio signal corresponding to received sound waves relating to the selected accompaniment melody;

key input means for inputting an operation instruction to the system controller;

display means for displaying an operation state of the microphone in response to control of the system controller;

mixed audio signal output means for outputting the selected accompaniment melody, and mixing the song audio signal with the selected accompaniment melody to output a mixed audio signal;

record and playback means for storing and outputting the mixed audio signal of the mixed audio signal output means in response to control of the system controller; a switch to selectively output the mixed audio signal output from the mixed audio signal output means and the stored mixed audio signal output from the record and playback means in response to control of the system controller; and transmitting means, including an antenna, for converting a signal selectively output by the switch into a high frequency signal to be transmitted by the antenna.

13. The microphone for automatic accompaniment as claimed in claim 12, wherein the record and playback means stores and outputs the mixed audio signal outputted from the mixed audio signal output means.

14. The microphone for automatic accompaniment as claimed in claim 12, wherein the record and playback means selectively stores and outputs the song audio signal and the mixed audio signal.

15. A microphone for automatic accompaniment comprising:

a system controller to control storage and outputting of a selected accompaniment melody and a song audio signal corresponding to received sound waves relating to the selected accompaniment melody;

key input means for inputting an operation instruction to the system controller;

display means for displaying an operation state of the microphone in response to control of the system controller;

mixed audio signal output means for outputting the selected accompaniment melody, and mixing the song audio signal with the selected accompaniment melody to output a mixed audio signal;

record and playback means for storing and outputting the mixed audio signal of the mixed audio signal output means in response to control of the system controller;

a switch to selectively output the mixed audio signal output from the mixed audio signal output means and the stored mixed audio signal output from the record and playback means in response to control of the system controller; and transmitting means, including an antenna, for converting a signal selectively output by the switch into a high frequency signal to be transmitted by the antenna, wherein the record and playback means comprises an analogue-to-digital converter to convert the mixed signal of the mixed audio signal output means into a digital signal;

a memory unit to store and output the digital signal of the analogue-to-digital converter in response to control of the system controller; and a digital-to-analogue converter to convert the digital signal output from the memory unit into the stored mixed signal as an analogue signal.

16. A microphone for automatic accompaniment comprising:

a system controller to control storage and outputting of a selected accompaniment melody and a song audio signal corresponding to received sound waves relating to the selected accompaniment melody;

key input means for inputting an operation instruction to the system controller;

display means for displaying an operation state of the microphone in response to control of the system controller;

mixed audio signal output means for outputting the selected accompaniment melody, and mixing the song audio signal with the selected accompaniment melody to output a mixed audio signal;

record and playback means for storing and outputting the mixed audio signal of the mixed audio signal output means in response to control of the system controller;

a switch to selectively output the mixed audio signal output from the mixed audio signal output means and the stored mixed audio signal output from the record and playback means in response to control of the system controller; and transmitting means, including an antenna, for converting a signal selectively output by the switch into a high frequency signal to be transmitted by the antenna, wherein the mixed audio signal output means comprises accompaniment melody store means for storing a plurality of accompaniment melodies and outputting the selected accompaniment melody in response to control of the system controller;

accompaniment melody synthesizing means for processing the selected accompaniment melody output from the accompaniment melody store means in response to control of the system controller, to synthesize the selected accompaniment melody and output a corresponding echo signal;

a digital-to-analogue convert to convert the echo signal of the accompaniment melody synthesizing means into an analogue signal;

a filter to filter the analogue signal output from the digital-to analogue converter;

a first amplifier to amplify the filtered analogue signal output from the filter;

a second amplifier to amplify the song audio signal, echo means for echoing the amplified song audio signal output from the second amplifier in response to control of the system controller; and mixing means for mixing the amplified analogue signal output from the first amplifier and the amplified song audio signal output from the echo means.

17. The microphone for automatic accompaniment as claimed in claim 16, wherein the accompaniment melody synthesizing means comprises:

a digital signal process unit to convert the accompaniment melody output from the accompaniment melody store means into a digital signal;

an accompaniment melody synthesizer unit to synthesize the digital signal output from the digital signal process unit into an accompaniment melody signal; and echo signal synthesizer unit for echoing the accompaniment melody signal synthesized in the accompaniment melody synthesizer unit in response to a selection of a user, so that the accompaniment melody synthesizer unit generates the echo signal.

18. An automatic accompaniment device which receives sound waves related to an accompaniment melody comprising:

a microphone to generate a song audio signal from the sound waves; and a receiver to receive the song audio signal generated from the microphone;

said microphone comprising a mixed audio signal output apparatus outputting the accompaniment melody and mixing the song audio signal with the accompaniment melody to generate a mixed audio signal and a record and playback apparatus storing and playing back the mixed audio signal.

19. The automatic accompaniment device as claimed in claim 18, further comprising a system controller, wherein the microphone further comprises a switch to selectively output the mixed audio signal of the mixed audio signal output apparatus and the stored mixed audio signal of the record and playback apparatus in response to control from the system controller.

* * * * *